Sept. 24, 1968    J. S. RANKIN    3,402,482
MATHEMATICS TEACHING DEVICE
Filed Dec. 8, 1966
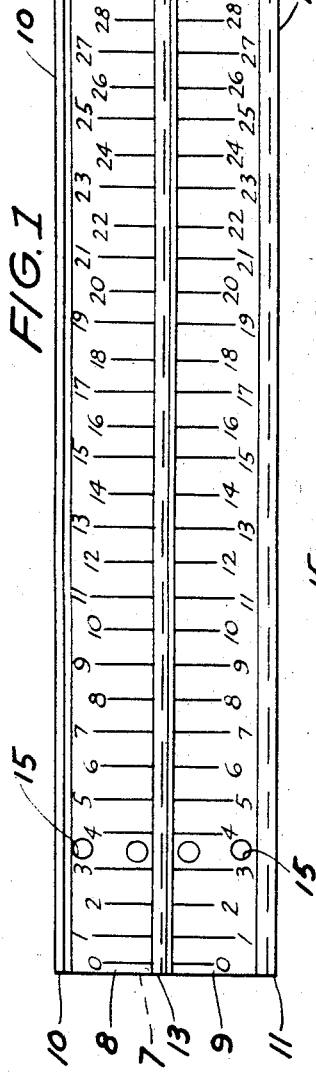
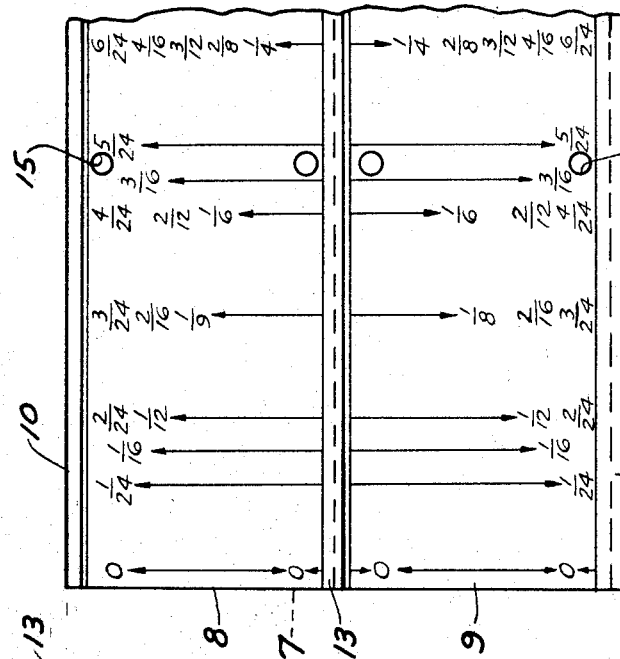
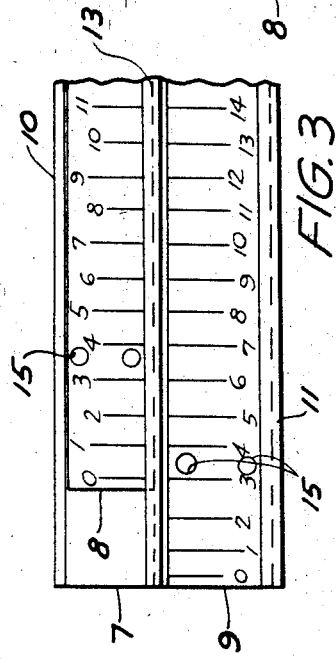
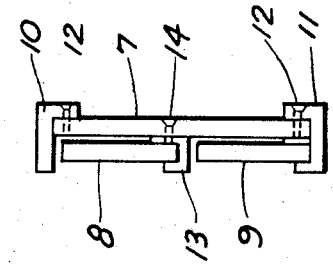
JOANNE S. RANKIN
INVENTOR.
BY Edward M. Apple
ATTORNEY

United States Patent Office 3,402,482
Patented Sept. 24, 1968

3,402,482
MATHEMATICS TEACHING DEVICE
Joanne S. Rankin, 2057 Rose St.,
Carleton, Mich. 48117
Filed Dec. 8, 1966, Ser. No. 600,126
5 Claims. (Cl. 35—31)

ABSTRACT OF THE DISCLOSURE

This application discloses a slide rule type of device for teaching fundamental mathematics to children. The invention resides in the particular combination and arrangement of the elements disclosed, particularly in the provision of a fixed panel, having a matched pair of smaller panels slidable on its face and supported, so that the smaller panels may be removed edgewise from the fixed panel and reversed. The removable panels are provided with whole numerals on one side and fractions on the reverse side. The device can teach addition, subtraction, multiplication and division in the areas of both whole numbers and fractions.

---

This invention relates to educational devices and has particular reference to a device for teaching fundamental mathematics to children, particularly in the primary grades.

An object of the invention is to provide a mechanical device with intelligible subject matter thereon which will provide the child with a mental image of a mathematical problem and answer, whereby the child will develop an ability to compute the solution of a problem mentally.

Another object of the invention is to provide a device through the use of which the child may visualize the placement of specific numbers within the number system.

Another object of the invention is to provide a device which will enable a pupil to understand addition, subtraction, multiplication and division, through concrete experiences.

Another object of the invention is to provide a device for teaching the basic mathematical operations and their inverses in the set of rational numbers so that a child will be able to see whether a number comes before or after a given number.

Another object of the invention is to provide a device which will enable a child to visually understand the basic operations of addition and subtraction, that is, when adding two or more numbers an element of the device is moved to the right, and to subtract one number from another, an element of the device is moved to the left with the answer visibly displayed.

Another object of the invention is to provide a device which is constructed and arranged with the even numbers and the odd numbers being displayed in different colors and sizes, so that the child may readily segregate the even numbers and the odd numbers.

Another object of the invention is to provide a device of the character indicated which will enable a child to check and find the correct answers to problems which might have been marked incorrect by the teacher during an examination.

Another object of the invention is the provision of a device of the character indicated which is constructed and arranged so that the movable elements of the device are reversible, whereby the manipulation of whole numbers may be illustrated on one face and the manipulation of fractions may be illustrated on the reverse face.

Another object of the invention is the provision of a device of the character indicated which is constructed and arranged so that the several slidable panels may be removed and replaced on the device with facility.

Another object of the invention is to provide a device of the character indicated which is constructed of a fixed panel and two slidable and removable panels, with means on the slidable panels for adjusting them with reference to each other and the fixed panel.

The foregoing and other objects and advantages of the invention will become more apparent as the description proceeds, reference being made from time to time to the accompanying drawings, forming part of the within disclosure, in which drawing:

FIG. 1 is a plan view of a device embodying the invention.

FIG. 2 is an end view of the device shown in FIG. 1.

FIG. 3 is a fragmentary portion of the device shown in FIG. 1, illustrating the manner in which the movable panels are adjustable with respect to the fixed panel.

FIG. 4 is an enlarged fragmentary section of the device shown in FIG. 1, illustrating the reverse faces of the movable panels, carrying fractions instead of whole numbers.

Referring now more particularly to the drawing, it will be understood that in the embodiment herein disclosed the reference character 7 (FIG. 2) indicates the fixed panel, which may be made of plywood, plastic, or other suitable material, and the reference characters 8 and 9 indicate the movable panels, which may be made of similar material.

It will be noted that the longitudinal edges of the fixed panel 7 are covered by the elements 10 and 11, which are secured to the back of the panel 7 by means of screws 12, or other suitable means.

It will also be noted that the front face of the panel 7 is provided with a channel member 13, which is secured to the panel 7 near its median line by means of screws 14, or other suitable means.

The members 10, 11, and 13, may be made of metal, plastic or other suitable material. The member 10 is preferably an angular member, which serves as a top guide for the panel 8. The member 11 is in the form of a double channel, in one of which channels is received the fixed panel 7, and in the other channel is slidably received the channel 9. The member is a channel shaped element which slidably receives the upper panel 8.

It will be noted that there is sufficient clearance between the top of the slidable panels 8 and 9, and the elements 10 and 13, so that the panels 8 and 9 may be removed from their channel supports by tilting the panels forwardly or to the left (FIG. 2).

It will be noted (FIGS. 1 and 3) that the front faces of the panels 8 and 9 are provided with whole numbers, and it will be noted in FIG. 4 that the reverse faces of the panels 8 and 9 are provided with fractions.

On the panels 8 and 9 the uneven whole numbers 1, 3, 5, 7, etc. are at the ends of longer lines, and the even numbers 2, 4, 6, 8, etc. are at the end of shorter lines. It is also within the contemplation of the invention to make the uneven numbers of one color and the even numbers of another color, so that they will readily stand out visually to the student.

The functioning of the device is the same whether the device is manipulating whole numbers or fractions.

The panels 8 and 9 (FIGS. 1, 3 and 4) are provided with finger-holes 15, so that the panels 8 and 9 may be shifted either to the right or to the left with respect to the fixed panel 7.

The device functions as follows:

At the outset of any problem the panels 8 and 9 are first positioned so that the zero marks are in alignment. Assuming then that it is desired to add the number 3 to the number 1, the panel 8 is moved to the right by means of the fingerhole 15, until the zero line of the panel 8 is over the number 3 of panel 9 (FIG. 3). In that position the number 1 line on panel 8 will then align with the number 4 line on panel 9. This gives the correct answer on panel 9, which is 4.

By the same token, the addition of any other number to the number 3 will give the correct answer on panel 9, immediately below the number being added to the number 3. That is, 3 plus 5 equals 8, or 3 plus 9 equals 12, etc.

Assuming now that the operator desires the answer to a problem in subtraction, the panels 8 and 9 are first positioned so that the zero marks are in alignment as before. In subtraction the panel 8 is moved to the left of panel 9 from the position shown in FIG. 1.

Assuming that it is desired to subtract the number 3 from the number 7, the 3 line of panel 8 is then moved so that it is in alignment with the zero line on panel 9, the answer 4 will then appear on panel 9 immediately below the line 7 on panel 8. By the same token, subtracting the number 3 from any other number on panel 8 will give the correct answer on panel 9 immediately below the number being substrated from. That is, 5 minus 3 is 2, and 9 minus 3 is 6, 15 minus 3 is 12, etc.

The foregoing illustrations are for whole numbers. If it is desired to work in fractions the panels 8 and 9 are simply reversed from the position shown in FIG. 1, so that the fractions appear on the reverse of the panels 8 and 9, as illustrated in FIG. 4.

The fuctioning of the device with fractions is the same as previously described with reference to whole numbers. That is, the panels 8 and 9 are first positioned with the zero lines in alignment. The panel 8 is then moved to the right for addition, or to the left for subtraction.

The device is used for multiplication and division as follows:

Multiplication is performed by repeated additions. As an example, multiplying 3×4. The panels 8 and 9 are positioned with the zero marks in alignment as before. Panel 8 is then moved to the right until the zero is above the 4 of panel 9. This will be 2×4, with the answer of 8 showing on panel 9 under the 4 of panel 8. The next move is to determine the answer to 3×4. This is done by moving panel 8 so that the zero on panel 8 is over the 8 of panel 9 (which was just determined). This will give you the correct answer of 12 on panel 9, under the 4 of panel 8. In other words, the correct answer will be found on panel 9 under the third appearance of the numeral 4 above the panel 9. This is the equivalent of adding 4 three times, or 4+4+4=12.

Division is performed by repeated subtractions. As an example, dividing 12 by 4. From the starting position, with the zero marks in alignment, slide panel 8 until the 4 of panel 8 is over the 12 on panel 9. Then place a clip or other marker on panel 9 below the 0 on panel 8. This gives a preliminary answer of 8 (one 4 has been subtracted). Then move panel 8 to the left until the 4 on panel 8 is over the 8 on panel 9. At this stage the 0 of panel 8 is over the 4 of panel 9 (two 4's have been subtracted). Place a clip or marker on the 4 of panel 9. Then move panel 8 to the left until the zeros are again in alignment and the 4's of each panel are in alignment. A clip is then placed below the 0. The clips are then counted to show the answer 3. In other words, 4 has been subtracted three times, leaving nothing as indicated by the aligned zeros. This is the equivalent of subtracting 4 three times, 12—4—4—4=0, or 12 divided by 4=3, or three groups of 4 in 12.

It is believed the operation of the device is obvious from the foregoing description.

Having described my invention, what I claim and desire to secure by Letters Patent is:

1. An educational device comprising a fixed rear panel, two movable front panels overlying said rear panel, channel elements along the lower edge and median line of said fixed panel to slidably secure said movable panels to the face of said fixed panel, and permit edgewise removal and replacement of said front panels, each of said movable panels having a like series of numerals on the face thereof, the numerals of one panel being alignable with the numerals of the other panel.

2. The structure of claim 1 in which the even numerals of each panel are designated by lines of one length and the uneven numerals of said panels are designated by lines of a different length.

3. The structure of claim 1, in which one face of each movable panel has received thereon a series of whole numerals and the reverse face of each said panel has received thereon a series of fractional numerals.

4. The structure of claim 1, including guide members on said fixed panel having flat faces spaced from the upper edges of said movable panels and arranged to permit said movable panels to be tilted out of said channels for removal.

5. The structure of claim 1, including at least one aperture each movable panel for receiving a finger, whereby said panels may be moved in forward and reverse directions.

References Cited

UNITED STATES PATENTS

| | | | |
|---|---|---|---|
| 711,486 | 10/1902 | Erwin | 35—75 |
| 732,935 | 7/1903 | Glaser | 235—70 |
| 1,165,058 | 12/1915 | Behan | 35—31 XR |
| 2,156,568 | 5/1939 | Lee | 235—70 |
| 2,685,748 | 8/1954 | Gilbert | 35—31 |

FOREIGN PATENTS 662,709  7/1938  Germany.

EUGENE R. CAPOZIO, *Primary Examiner.*

W. H. GRIEB, *Assistant Examiner.*